United States Patent [19]

Bibbero

[11] 4,084,906
[45] Apr. 18, 1978

[54] MULTIGAS DIGITAL CORRELATION SPECTROMETER

[75] Inventor: Robert J. Bibbero, Merion Station, Pa.

[73] Assignee: Honeywell Inc., Minneapolis, Minn.

[21] Appl. No.: 724,957

[22] Filed: Sep. 20, 1976

Related U.S. Application Data

[63] Continuation of Ser. No. 547,706, Feb. 6, 1975, abandoned.

[51] Int. Cl.$^2$ ............................ G01J 3/42; G01J 3/48
[52] U.S. Cl. ...................................... 356/96; 250/343; 250/565; 356/188
[58] Field of Search ................. 356/51, 96, 97, 188, 356/189; 250/339, 341, 343, 351, 565

[56] References Cited

U.S. PATENT DOCUMENTS

| | | | |
|---|---|---|---|
| 3,640,625 | 2/1972 | Ibbett et al. | 356/97 |
| 3,728,540 | 4/1973 | Todd et al. | 356/51 |
| 3,794,425 | 2/1974 | Smith et al. | 356/51 |
| 3,832,548 | 8/1974 | Wallack | 250/343 |
| 3,886,331 | 5/1975 | Schierer, Jr. | 356/96 |

Primary Examiner—Vincent P. McGraw
Attorney, Agent, or Firm—Laurence J. Marhoefer; Lockwood D. Burton

[57] ABSTRACT

A spectrometer for monitoring a gaseous mixture detects one or more component gases of interest by converting the spectrum of the mixture at certain discrete wavelengths to binary numbers which are correlated with a stored series of binary numbers corresponding to the spectrum of a component gas of interest at the same wavelengths.

1 Claim, 3 Drawing Figures

MULTIGAS DIGITAL CORRELATION SPECTROMETER

This is a continuation of application Ser. No. 547,706, filed Feb. 6, 1976, now abandoned.

BACKGROUND OF THE INVENTION

1. FIELD OF THE INVENTION

This invention relates to the art of correlation spectrometry and more particularly to an improved correlation spectrometer which can detect and quantify a number of specific gases or vapors in a mixture of gases or vapors with relative ease and speed as compared with prior art correlation spectrometers.

In protecting the earth's fragile environment while at the same time preserving an efficient industry necessary for an industrial society, a need has arisen to simply and economically check the waste products of our industrial processes for certain noxious or undesirable gases and vapors. It is possible, in the absence of gases or vapors with interfering spectra, to set a spectrometer to a band of wave lengths corresponding to one peak of absorption of the pure gas component of interest (COI) and, with suitable calibrations, to quantitively determine the total amount of the COI in the optical path. In the presence of interfering gases, the location of the band must be chosen so that absorption in that spectral region is unique to the COI; however, this is often difficult to achieve because most gases have rather complex absorption spectra. Particularly, omnipresent components, such as water vapor, have absorption spectra which mask many COI's.

In addition, a single line system has low sensitivity and poor specificity. Both qualities can be improved by using more of the absorption spectrum than a single line.

2. DESCRIPTION OF THE PRIOR ART

In the prior art, an effective and a sensitive apparatus for detecting and measuring the concentration of a pure gas COI in a mixture of gases and/or vapors is to correlate a spatially dispersed radiation absorption spectrum of the mixture or sample thereof with an optical mask representing the absorption spectrum of the pure gas COI.

Prior art correlation spectrometers commonly use a transmission mask which is a replica of the COI in the sense that those regions of the mask which correspond to absorption maximum are left opaque, and those which correspond to absorption minimum are transparent. A detector, such as a photomultiplier tube, is exposed to greatly increased radiation when the mask and the absorption spectrum are aligned. The mask is periodically shifted relative to the spectrum so that the radiation incident on the detector falls to a lower level as the mask and the spectrum pass from correlation to anti-correlation.

Reference may be had to the following materials for a more detailed description of correlation spectrometers and other related works:

A. R. Barringer, "Chemical Analysis by Remote Sensing", presented as a High Session at the 23rd Annual ISA Instrumentation Automation Conference, October, 1968;

A. R. Barringer and J. D. McNeill, "Advances in Correlation Techniques Applied to Spectrometry", presented at the National AID Symposium of the ISA, New Orleans, May, 1969;

A. Bessen, "Pattern Recognition Logic Analyzes Infrared Signals", Electronics, Nov. 11, 1968, pp. 112-118;

U.S. Pat. No. 3,820,901, "Measurement of Concentrations of Components of a Gaseous Mixture", June 28, 1974;

U.S. Pat. No. 3,807,876, "Gas Densitometer", Apr. 30, 1974;

U.S. Pat. No. 3,790,798, "Method and System for the Infrared Analysis of Gases", Feb. 5, 1974;

U.S. Pat. No. 3,447,876, "Apparatus for Detecting Monatomic Vapours", June 3, 1969;

U.S. Pat. No. 3,449,565, "Apparatus for Absorption Analysis Using a Source Having a Broadened Emission Line", June 10, 1969;

U.S. Pat. No. 3,549,260, "Spatially Dispersive Correlation Interferometer", December 22, 1970;

U.S. Pat. No. 3,518,002, "Spectrometer", June 30, 1974; and

U.S. Pat. No. 3,578,980, "Spectral Analysis Using Masks Having Different Combinations of Transmitting and Non-Transmitting Portions", May 19, 1971.

Correlation spectrometers, while generally satisfactory, are limited in that only one COI can be monitored without changing the mask; a time consuming and difficult task, particularly if the spectrometer is located in a remote location. Two COI's can be monitored by using parallel paths, but this apparatus is cumbersome and expensive.

An object of this invention is the provision of a correlation spectrometer which can perform multi-gas analysis very rapidly without the problem of mechanically exchanging masks and realignment of the instrument. An additional object of the invention is the provision of an instrument which can perform sophisticated correlations and thus provide increased detection sensitivity.

SUMMARY OF THE INVENTION

Briefly, this invention contemplates the provision of a correlation spectrometer in which the absorption spectrum of the pure gas COI, which is at a known, standard concentration and pressure, is stored as a series of binary numbers. A suitable radiation source, scanning sequentially in time through the same wave band as the stored spectrum, is directed upon a gas sample. Radiation emerging from the sample is detected and converted to a series of binary numbers, which represent the spectrum of gas sample. These numbers are correlated with the numbers representing the stored spectrum to measure the quantity of the COI in the sample.

The spectrum for a number of pure COI's can be stored easily in binary form and correlated with successive scans of the gas sample to measure the amount of a number of different COI's in the sample. Alternatively, the results of a single scan of the gas sample can be stored in binary form and successive correlations performed on this stored data.

BRIEF DESCRIPTION OF THE DRAWINGS

Referring now to the drawings, which are to be read in conjunction with and which form a part of this specification, and in which like reference numerals are used to indicate like parts, in the various views.

DESCRIPTION OF THE PREFERRED EMBODIMENT

DETAILED DESCRIPTION

Figure 1:
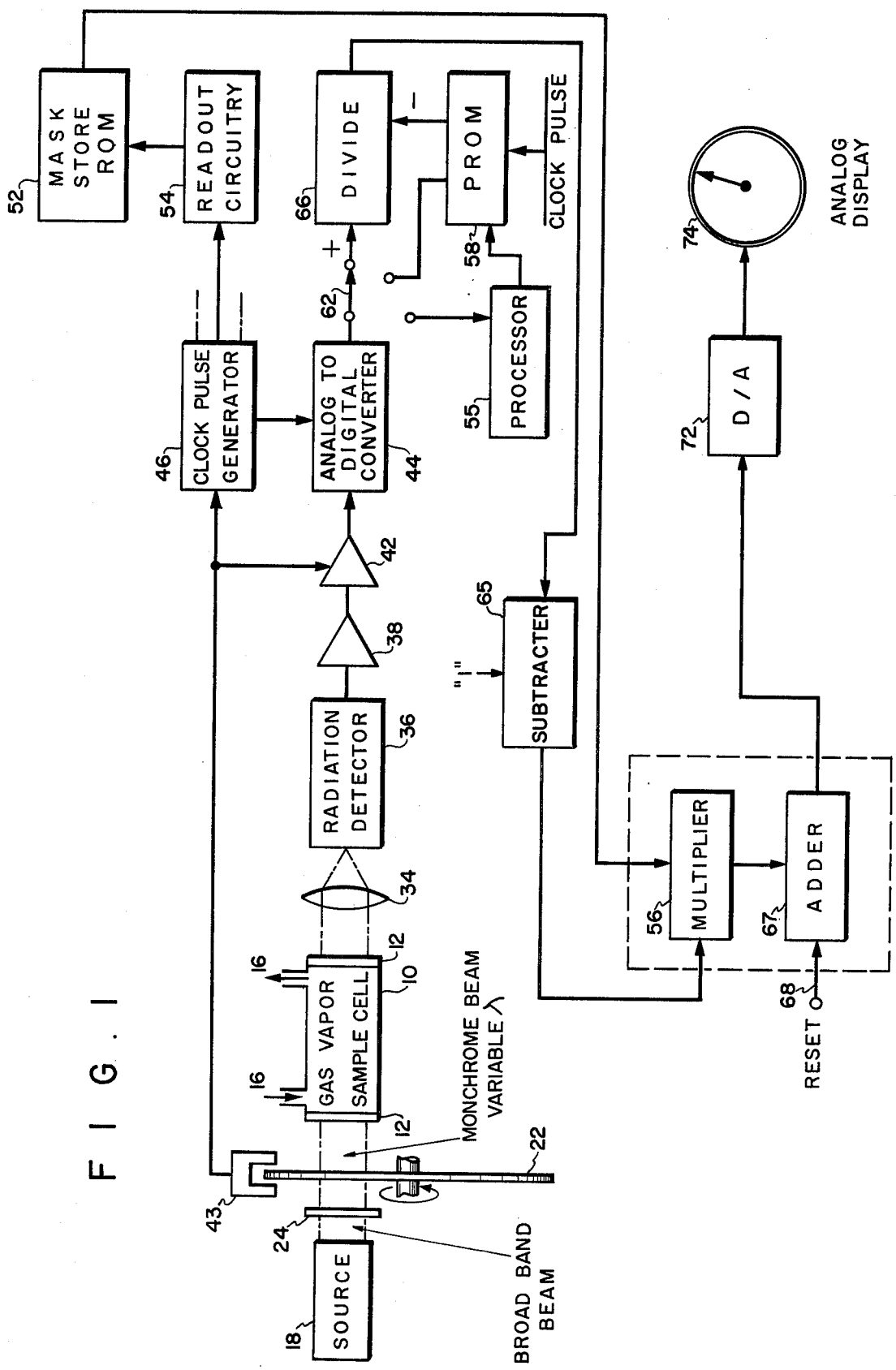
FIG. 1 is a diagram, partially in schematic form and partially in block form, of an embodiment of a correlation spectrometer in accordance with the teachings of this invention.

Referring now to FIG. 1 of the drawings, a gas and/or vapor sample cell 10 of predetermined length has end windows 12 which are transparent to radiation in the wave band of interest — e.g. the infrared band. The gas and/or vapor mixture under investigation enters and exists the cell 10 through ports 16. Preferably, the pressure and temperature of the gas in the cell are maintained at known values.

The cell 10 is illuminated from the left-hand side in FIG. 1 by a beam of radiation confined at any instant to a very narrow band of frequencies. The center of this narrow band is swept across the entire band of interest. For example, if the component gas of interest were nitrogen oxide (NO) and/or carbon monoxide (CO), the tunable mono-chromatic source would be swept to include wave lengths between 4.5 and 5.5 microns.

In the illustrative embodiment of the invention in FIG. 1, a broad band radiation source 18 in combination with a continuously rotating variable filter 22 generates the variable mono-chromatic beam. Here, the radiation from source 18, which passes through a narrow optical slit 24, falls on to a continuously rotating variable wave length interference filter 22 of a suitable design known in the art. Such filters are commercially available. This filter passes a narrow band of frequencies which passband varies as the disk rotates.

Figure 2:
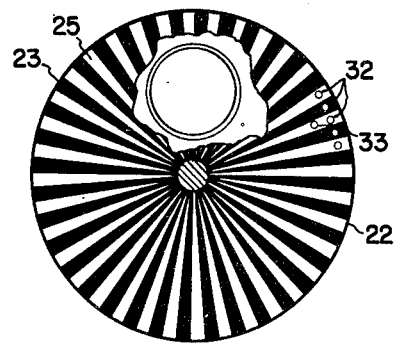
FIG. 2 is a detailed view of the tunable monochrometer used in FIG. 1.

As can be seen readily in FIG. 2, the filter disk preferably has alternating opaque and transparent regions 23 and 25 respectively, so that it also serves as a radiation chopper to allow synchronous detection of the information signal. In addition, a series of perforations 32 in the disk 22 are located around its periphery in order to generate a series of clocking pulses in a manner well known to those skilled in the art. One hole 33 serves to provide a synchronizing pulse to mark the start of each scan.

An alternative tunable mono-chromatic source suitable for the practice of this invention is a tunable laser which provides both a high intensity and a narrow band of wave lengths in the range of interest. Suitable tunable lasers are known in the prior art, including organic die type, spin-flip Raman lasers, and semiconducting lasers including PbSnSe, PbSnTe and PbCds. A spin-flip $CO_2$ laser, for example, can be tuned over a range between 5.3 to 6.2 microns by varying its magnetic field and can supply on the order of 1 watt of continuous wave power.

As the mono-chromatic beam passes through the sample cell 10 containing the sample gas of unknown constituents, its power is modulated by the optical absorption of the sample gas. This modulation is a function of the wave length of the radiation instantaneously incident upon the cell.

A lens 34 collects the radiation exiting from the sample cell and directs it to an appropriate detector 36 which, for example, in the case of an infrared wave band, may be a lead mercury telluride solid state detector, for example. The output signal of detector 36 is a varying electric signal which represents the characteristics of the time dispersed absorption spectrum of the gas or vapor mixture in the sample cell. Included in this absorption spectrum is the absorption spectrum of the COI if it is present.

A preamplifier 38 amplifies the output of detector 36 and this amplified information signal is coupled as one input to a synchronous detector 42 whose synchronizing input is from a photodetector 43, such as a photodiode, which produces an output signal in response to each of the holes 32 around the peripheral of disk 22. An analogue to digital (a/d) converter 44 converts the output of detector 42 to a series of binary numbers; 8 bit binary numbers, for example. A clock pulse generator 46 controls the sampling rate of the a/d converter and the pulses from pickup 44 maintain the clock pulse generator 46 in synchronization with the sweep of the mono-chromatic radiation through the wave band of interest. A pulse produced by 33 synchronizes the system with the beginning of each sweep.

The output of the a/d converter 44 is a series of binary numbers representative of the analogue signal magnitude for a series of discrete wave lengths throughout the sweep band. These binary numbers are correlated with series of binary numbers stored in a read-only-memory (ROM) 52. The numbers stored in the ROM represent the absorption spectrum of a COI at discrete wave lengths throughout the sweep band. These discrete wave lengths are the same wave lengths at which the a/d converter 44 samples the analogue output signal.

The proper numerical values to store in the ROM for each pure gas COI of interest can be determined by placing only that COI in the sample cell and scanning it through a wave band of interest. The concentration or pressure of the COI should be at some reference value, e.g., 1 atmosphere. The series of numbers which constitute output of the a/d converter can be recorded in a suitable manner known in the art, and these numbers can be used to program the ROM. Alternatively, the proper numerical values for storage in the ROM may be determined by reading the output of a high or even medium resolution spectrometer covering the desired range. In either case stored binary numbers preferably represent radiation emerging from the sample cell 10 for each discrete wave length of interest (Pi) as a fraction of the incident radiation (Po), i.e., Pi/Po. Collectively, after suitable correction as explained below, these numbers or the entire spectrum of interest of the pure COI are referred to as the "Mask" or Pi mask.

Here, it should be noted that the absolute power of the variable mono-chromatic beam may change with wave length before it enters the gas sample cell 10 and the sensitivity of the radiation detector and/or optical train may vary as well. Such changes could result in an erroneous spectrum signal. However, it is possible to correct the wave length dependent portion of this error signal by zero calibration of the system. This can be done by placing in the sample cell 10 a so-called "zero gas"; that is, a gas transparent to all wave lengths of interest, such as nitrogen. With a zero gas, the numerical outputs of the a/d converter vary as a function of the power attenuation of the source, detector and optical train, which attenuation in turn varies as the wave length of the incident radiation varies. Preferably, the wave length dependent output (Wi) for each wave length of interest is referenced to a single output (Wo) conveniently the output of least attenuation. The resultant factor (Wi/Wo) can be used to correct for the system attenuation and also to convert output of converter 44 to a fraction of incident radiation Po. It should be noted that the values stored in ROM 52 should also be corrected for attenuation of the spectrographic optical system.

In one embodiment of the invention, to determine a correction factor for power attenuation the optical and electronic systems as a function of wave length, a switch 62 couples the output of a/d converter 44 to a suitable data processing apparatus 55 with a zero gas in the cell 10. The source is swept through the wave lengths of interest and the Wi/Wo are determined.

In its simplest form, the data processing apparatus 55 may merely cause a print-out of the data from which Wo can be determined by inspection and the Wi/Wo calculation can be performed manually. Of course, a suitable microprocessor can be used if desired. A series of correction factors Wi/Wo derived from zero gas scan are stored in programmable memory 58.

In performing an analysis of an unknown gas in cell 10, switch 62 couples the output of a/d converter 44 to a digital circuit 66 which performs the arithmetic function of division of its input signals. The contents of PROM memory 58, which are read out in sequence with the scan, provides the other input to circuit 66. Its output is a series of binary numbers representative of the relative power output (Pi) at each discrete wave length referenced to a zero gas value which has been corrected for attenuation of the mono-chrometer input to the cell and attenuation through the electronics. This corrected value of Pi will be designated Pic.

In a preferred embodiment of the invention, a reverse image of spectrum of the unknown gas is correlated with positive spectrum of the pure COI stored in ROM 52. To this end, binary circuit 65 subtracts the output of 66 from 1 and has an output 1-Pic, thus in effect creating a reversed image of the spectrum.

A read-out control circuit 54 receives inputs from the clock pulse generator 46 and causes the contents of ROM 52 to be readout in a sequence corresponding in time to the instantaneous wave band incident upon cell 10. The output of the ROM 52 (Pi mask) is coupled to one input of a digital circuit 56 which performs the arithmetic function of multiplication of its inputs. The output (1-Pic) of circuit 65 provides the other input to multiplier 56.

The sum of the multiplications performed by multiplier 56 ( $\Sigma$ Pi mask (1-Pic)) is a function of the correlation between the stored numbers and the numerical representation of the unknown gas. A digital circuit 67 performs the arithmetic function of summing the output Pi mask of multiplier 56.

This sum, whose magnitude is a function of the correlation between stored spectrum of the pure COI and reverse spectrum of the unknown gas, has a linearly increasing value with increasing concentration of the COI. In the embodiment shown, a d/a converter 72 converts the output of adder 67 to an analogue signal for display on a suitable analogue meter 74. It should be noted that the adder circuits are reset at the beginning of each scan by means of a signal generated by hole 33.

For a specific example of the operation of the invention, the ROM will be programmed to detect two components of interest (COI), carbon monoxide (CO) and nitric oxide (NO), which have absorption spectra in the region 1800–2200 $cm^{-1}$ (wavenumber). In order to simplify the example, numerical values for only four discrete wavenumbers at 30 $cm^{-1}$ intervals ranging from 2060 to 2150 for CO and five at the same intervals from 1850 to 1970 for NO will be considered. It should be understood, however, that this coarse interval of 30 $cm^{-1}$ by no means represents the capability of optics or laser resolution; in fact with conventional rocksalt prisms in this region, a resolution of 3–7 $cm^{-1}$ is readily obtained. Lasers are capable of even better resolution.

Returning now to the simplified example, the numbers corresponding to the transmittance of pure samples of CO and NO gases are listed in Table I according to the corresponding wavenumber and also the time when they would appear at the a/d converter 44. In order to establish a typical time sequence it is assumed that the wavenumber resolution is 3 $cm^{-1}$ and that 4 milliseconds

TABLE I

|  | CO (MASK) | | | | NO MASK | | | | |
|---|---|---|---|---|---|---|---|---|---|
| Time (MS) | 40 | 80 | 120 | 160 | 280 | 320 | 360 | 400 | 440 |
| Wavenumber ($cm^{-1}$) | 2150 | 2120 | 2090 | 2060 | 1970 | 1940 | 1910 | 1880 | 1850 |
| Transmittance (Pi mask) | .40 | .25 | .35 | .55 | .80 | .70 | .40 | .30 | .50 |
| Wi/Wo | .98 | .99 | .99 | .98 | .97 | .97 | .96 | .95 | .95 |
| Sample #1, CO: ½; NO:0 | | | | | | | | | |
| Pi | .62 | .49 | .58 | .73 | .97 | .94 | .94 | .93 | .92 |
| Pic | .63 | .50 | .59 | .75 | 1.00 | .98 | .99 | .98 | .97 |
| $\Sigma$ Pi mask (1-Pic) | | | | .57 | | | | | .03 |
| Sample #2, CO: O; NO: ½ | | | | | | | | | |
| Pi | .96 | .98 | .97 | .98 | .90 | .86 | .70 | .64 | .75 |
| Pic | .98 | .99 | .98 | 1.00 | .92 | .89 | .72 | .67 | .79 |
| $\Sigma$ Pi mask (1-Pic) | | | | .02 | | | | | .45 |
| Sample #3, CO: ½; NO: ½ | | | | | | | | | |
| Pi | .72 | .62 | .70 | .80 | .87 | .81 | .60 | .52 | .67 |
| Pic | .74 | .63 | .71 | .82 | .90 | .84 | .63 | .55 | .71 |
| $\Sigma$ Pi mask (1-Pic) | | | | .40 | | | | | .625 |

(ms) separate the samples for each a/d conversion. Since only every tenth sample is shown in this example, the time between samples is shown as 40 ms instead of 4 ms.

Table I shows the time sequence on the first line; the wavenumber of the scanning radiation on the second line; and the transmittance, or ratio of radiant power emerging from the sample tube containing pure COI to the entering radiation; Pi mask on the third line for the pure COI. The series of numbers stored in PROM 58 (Wo/Wi) for this illustrative embodiment are shown on the fourth line. The gas samples from which mask numbers were obtained were at "unity" or "100%" concentration at one atmosphere partial pressure. They have been corrected for the spectral variations of the source and optical train through the sample tube.

The numbers, shown in decimal form, which constitute the "mask" for the pure gases, are stored in the read-only memory (ROM) 52 in binary form. All numbers are shown in decimal form (for convenience in this example), but it will be understood that they will actually be stored and manipulated in binary form after leaving the a/d converter.

It will be also noted that the first four numbers shown, covering the wavenumber range 2060 to 2150 cm$^{-1}$, constitute the CO unity concentration mask or reference. The next five numbers on this line, $P_{1850,1}$ to $P_{1970,1}$ corresponding to wavenumbers 1850 to 1970 cm$^{-1}$, constitute the unit concentration reference or mask for NO.

It should be noted that Beer's law does not apply rigorously to broad absorption bands such as are employed in the operation of conventional non-dispersive spectrometers and photometers, thus it is not possible to calculate a priori a calibration curve for those instruments. With this invention however, if a sufficiently narrow bandwidth is used, such as that obtained from a laser source, the Beer's law calculation holds and thus a calibration curve can be computed from a single "span" measurement to a sufficient accuracy, obviating the need for special purity calibration gases and time-consuming procedures.

Sample #1 of Table I contains 50% concentration of CO and only a trace of NO or equivalent interfering gases or noise; Sample #2 contains no CO and a 33% concentration of NO; and Sample #3 contains 33% CO and 50% NO.

The numerical output (in decimal form) of the divider 66 for each sample is shown on the first line under each sample.

Returning to Table I, the output of adder 67, Σ Pi mask (1-Pic), increases linearly with increasing concentration and is nearly zero when the COI concentration is nearly zero. A thresholding technique can be employed to recognize the "pattern" of the COI. A low (near zero) value of the COI is signified by ratio of approximately one (1). Therefore the presence of the COI can be identified by setting a threshold slightly above O, the exact value depending on the noise expected in the system. This "pattern detection" feature can be used to discriminate between low values of the COI present, which will match the COI mask identically, and interference by other gases or random signals which will fail to match.

It will be appreciated that the spectrum for both CO and NO can be easily stored in ROM 52; if desired additional masks may be stored. In this manner the gas in cell 10 can be analyzed for different COI's on each successive scan by merely reading out a different mask from the memory on each successive scan. If desired, the data from a single scan may be analyzed for several different COI's by the use of duplicate processing apparatus such as multiplier 56 and adder 66. In addition, if desired, the data from a single scan can be stored and analyzed for several different COI's.

Figure 3:
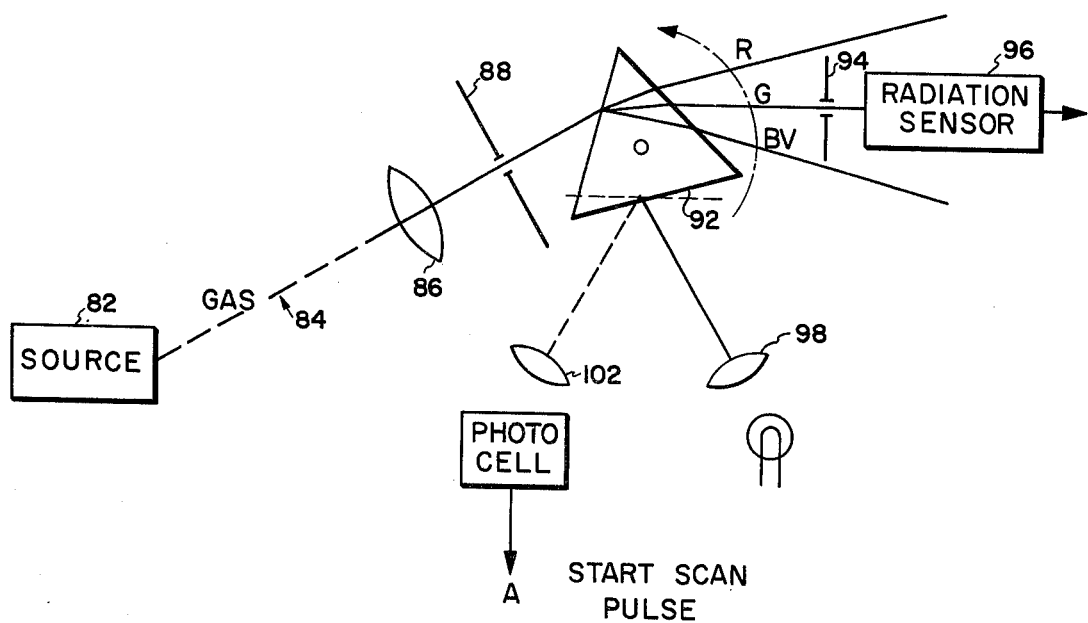
FIG. 3 is a schematic view of an alternative embodiment of a tunable mono-chrometer which may be used in the practice of this invention.

FIG. 3 illustrates another embodiment of a variable mono-chrometer which is particularly suited for analyzing gases from remote locations, such as stack gases. Here radiation from a broad band source 82 (which may be reflecting sunlight for example) passes through the gas in the region indicated by the general reference numeral 84. It should be noted that the gas in this case is not necessarily confined.

A lens 86 collects the radiation and directs it through a narrow slit 88 onto a continuously rotating optical prism 92. The prism 92 disperses the incident radiation into a continuous spectrum in space. As the prism rotates, this spatially dispersed spectrum is directed upon a suitable radiation detector 96 which is the functional equivalent of detector 36 in FIG. 1.

A lamp 98 in combination with a photo-detector 102 provides a synchronizing pulse for the start of each scan, and a tone wheel (not shown) driven with the rotating prism can provide a series of clock synchronizing pulses. The output of detector 96, therefore, may be processed in the same manner as the output of detector 36 described in FIG. 1. It should be noted that the spectrum of FIG. 3 may be limited to that of interest for a particular COI by the use of filters or digitally by generating start and stop scan pulse for a limited spectrum by the positioning of source 98 and detector 102.

This invention lends itself to the use of additional and more complex algorithms for correlating the stored spectrum of the COI and the spectrum of the gas undergoing analysis.

The embodiments of the invention in which an exclusive property or privilege is claimed are defined as follows:

1. A spectrometer for monitoring a gaseous mixture in order to detect a component gas of interest in said mixture, comprising in combination:
   a source of monochromatic radiation disposed to irradiate said mixture;
   means for periodically sweeping said source through a predetermined spectrum of frequencies;
   means disposed to receive the radiation emerging from said mixture and produce an electrical analogue signal which is a function of the intensity of the radiation received;
   means synchronized with said periodically sweeping means for converting said electrical analogue signal to an output signal comprising series of binary numerical electrical signals representative of said analogue electrical signal to a plurality of discrete predetermined wavelengths;
   means for storing a plurality of binary numbers whose values are a function of a spectrum of a component gas of interest at said discrete, predetermined wavelengths; and
   means for correlating the binary output signal of said converting means with the binary numbers in said storage means including means to divide the output of said converting means by a series of binary numbers whose values are a function of the values of the output of the converter means at said predetermined wavelengths for a predetermined absorption by a gas mixture and means for subtracting the output of said divider means from one, means for multiplying the output of said subtracter means with the numbers stored in said storage means, and means for summing the output of said multiplier means.

* * * * *